United States Patent Office 2,964,523
Patented Dec. 13, 1960

2,964,523

$\Delta^4$-PREGNENE-9$\beta$,11$\beta$-OXIDO-6$\beta$,12$\alpha$-DIOL-3,20-DIONE

Josef Fried, Princeton, and Richard W. Thoma, Somerville, N.J., assignors to Olin Mathieson Chemical Corporation, New York, N.Y., a corporation of Virginia No Drawing. Original application Mar. 1, 1957, Ser. No. 643,253. Divided and this application Nov. 16, 1959, Ser. No. 852,926

1 Claim. (Cl. 260—239.55)

This application is a division of our parent application, Serial No. 643,253, filed March 1, 1957.

This invention relates to and has for its object the provision of a certain new 12-oxygenated steroid i.e., $\Delta^4$-pregnene-9$\beta$,11$\beta$-oxido-6$\beta$,12$\alpha$-diol-3,20-dione.

The compound of this invention is prepared by fermenting a nutrient medium containing as a substrate 9(11)-dehydroprogesterone with a microorganism which is capable of 11-hydroxylating steroids saturated in the C-ring, and unsubstituted in the 11-position. Examples of such organisms include *Colletotrichum phomoides, Thamnidium elegans, Aspergillus nidulans, Tricothecium roseum, Colletotrichum pisi, Coniothyrium helleborine, Cunninghamella blakesleeana, Curvularia lunata, Aspergillus niger, Syncephalastrum racemosum, Neurospora sitophila, Rhizopus nigricans.*

In general, the conditions of culturing the microorganisms for the purpose of this invention are (except for the inclusion of the steroid to be converted) the same as those of culturing various other aerobic fungi for the production of antibiotics, organic acids or vitamins, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose, starch or dextrin), a higher fatty acid, a fat and/or 9(11)-dehydroprogesterone itself. Preferably, however, the medium includes an assimilable source of carbon and energy in addition to the steroid. The sources of nitrogenous factors may be organic (e.g., soybean meal, corn steep liquor, meat extract and/or distillers solubles) or synthetic (e.g., composed of simple, synthesizable organic and inorganic compounds, such as ammonium salts, alkali nitrates, amino acids or urea).

An adequate sterile-air supply should be maintained during fermentation, for example, by the conventional methods of exposing a large surface of the medium to air or by utilizing a submerged aerated culture. The steroid substrate may be added to the culture during the incubation period, or included in the medium prior to sterilization or inoculation.

The process yields inter alia the compound of this invention, viz: $\Delta^4$-pregnene-9$\beta$,11$\beta$-oxido-6$\beta$,12$\alpha$-diol-3,20-dione.

The compound of this invention is a physiologically active steroid which is useful as a progestational agent. Thus, it can be administered instead of, and in the same manner as, progesterone in the treatment of habitual abortions.

The following example is illustrative of the invention (all temperatures being in centigrade):

EXAMPLE $\Delta^4$-pregnene-9$\beta$,11$\beta$-oxido-6$\beta$,12$\alpha$-diol-3,20-dione (a) *Fermentation.*—All incubation temperatures are at 25°. Surface growth from a one-week-old agar slant culture of *Colletotrichum phomoides* ATCC 12521 (American Type Culture Collection, Washington, D.C.) [the slant contains soybean meal, 37.5 g.; starch, 20 g.; $CaCO_3$, 2.5 g., and water to make one liter] is washed off with 0.01% aqueous Duponol (wetting agent) solution. The suspension is distributed in equal aliquots among ten 250-ml. conical flasks each containing 50 ml. of the following sterile medium (A):

| | G. |
|---|---|
| Dextrose | 10 |
| Cornsteep liquor | 6 |
| $NH_4H_2PO_4$ | 3 |
| Yeast extract | 2.5 |
| $CaCO_3$ | 2.5 |
| Soybean oil | 2.2 |

Distilled water to one liter. pH 7.0; sterilized by autoclaving.

After 69 hours of mechanical shaking at 280 r.p.m. in a 2-inch radius, a 10% (vol./vol.) transfer is made to 75 similar flasks containing the same sterile medium (A). After 44 hours' incubation of the second flask stage, 925 mg. of 9(11)-dehydroprogesterone in 37.5 ml. methanolic solution is added (25 mg. per flask). After 5 hours' further incubation the contents of the flasks are filtered through a Seitz clarifying pad; flasks and pad are washed. The total volume of filtrate and wash is 4150 ml.

(b) *Isolation of 6$\beta$,12$\alpha$-dihydroxy-9(11)-dehydroprogesterone.*—The culture filtrate (4150 ml.) is extracted with five 1-liter portions of chloroform and the combined extracts evaporated to dryness in vacuo. The semi-crystalline residue (about 1.215 g.) is triturated with acetone and the resulting crystals (about 552 mg.) recrystallized from acetone. Pure 6$\beta$,12$\alpha$-dihydroxy-9(11)-dehydroprogesterone [$\Delta^{4,9(11)}$-pregnadiene-6$\beta$,12$\alpha$-diol-3,20-dione] obtained in this manner has the following properties: M.P. about 231–232°; $[\alpha]_D^{23}$ +107° (c, 0.49 in $CHCl_3$);

$\lambda_{max}^{alc}$ 234 m$\mu$ ($\epsilon$=11,000); $\lambda_{max}^{Nujol}$ 2.96–3.00, 5.92, 6.04, 6.21, 11.44$\mu$ The substance gives a characteristic purple color with concentrated sulfuric acid.

*Analysis.*—Calculated for $C_{21}H_{28}O_4$ (344.44): C, 73.22, H, 8.19. Found: C, 73.40; H, 7.88.

(c) *Isolation of $\Delta^4$-pregnene-9$\beta$,11$\beta$-oxido-6$\beta$,12$\alpha$-diol-3,20-dione.*—The mother liquors from the above crystallization (two experiments) are combined, dissolved in 5 ml. of chloroform and 45 ml. of benzene and chromatographed on 40 g. of acid-washed aluminum oxide. Elution with 20% chlorform in benzene (1600 ml.) gives amorphous material, which is followed by a crystalline fraction when the eluant is changed to chloroform-benzene 1:1. 1600 ml. of the latter solvent mixture elutes 420 mg. of crude crystals, which after recrystallization from acetone gives a pure product $\Delta^4$-pregnene-9$\beta$,11$\beta$-oxide-6$\beta$,12$\alpha$-diol-3,20-dione, of the following properties: M.P. about 202–204°; $[\alpha]_D^{23}$ +4.6° (c, 0.41 in $CHCl_3$);

$\lambda_{max}^{alc}$ 237 m$\mu$ ($\epsilon$=15,600); $\lambda_{max}^{Nujol}$ 2.95, 3.07, 5.95, 6.02, 6.18$\mu$

*Analysis.*—Calculated for $C_{21}H_{28}O_5$ (360.44): C, 69.97; H, 7.83. Found: C, 69.48; H, 7.79.

The invention may be otherwise variously embodied within the scope of the appended claim.

What is claimed is:

$\Delta^4$-pregnene-9$\beta$,11$\beta$-oxide-6$\beta$,12$\alpha$-diol-3,20-dione.

References Cited in the file of this patent

UNITED STATES PATENTS

| 2,894,007 | Graber et al. | July 7, 1959 |
| 2,914,543 | Fried et al. | Nov. 24, 1959 |